Figure 1:
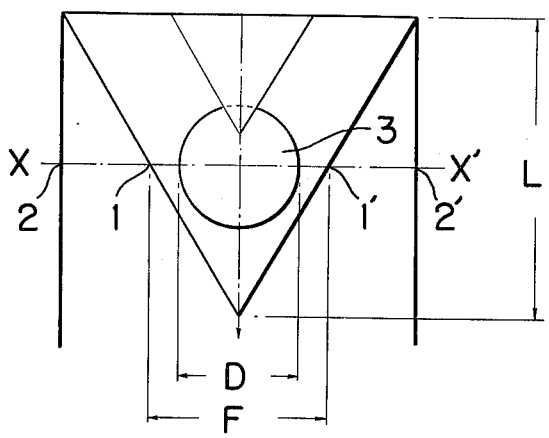

United States Patent [19]
Tokimoto et al.

[11] 4,113,844
[45] Sep. 12, 1978

[54] METHOD OF PRODUCING HIGH-PURITY TRANSPARENT VITREOUS SILICA BODY

[75] Inventors: Tadashi Tokimoto, Fujisawa; Kazumasa Kawaguchi, Hiratsuka; Junji Izawa, Hiratsuka; Yoshinobu Hiraishi, Hiratsuka, Japan

[73] Assignee: Komatsu Electronci Metals, Co., Ltd., Tokyo, Japan

[21] Appl. No.: 733,400

[22] Filed: Oct. 18, 1976

[30] Foreign Application Priority Data
Nov. 20, 1975 [JP] Japan .................. 50-138659

[51] Int. Cl.² ........................................... C01B 33/12
[52] U.S. Cl. .................................. 423/336; 423/337
[58] Field of Search .................. 423/336, 337; 65/18

[56] References Cited
U.S. PATENT DOCUMENTS

| 2,272,342 | 2/1942 | Hyde | 423/336 |
|---|---|---|---|
| 3,275,408 | 9/1966 | Winterburn | 423/337 |
| 3,423,324 | 1/1969 | Best et al. | 423/336 X |
| 3,661,519 | 5/1972 | Driscoll | 423/336 |

Primary Examiner—Jack Cooper
Attorney, Agent, or Firm—Larson, Taylor and Hinds

[57] ABSTRACT

A method of producing high-purity transparent vitreous silica body through flame hydrolysis of high-purity silane type gas, comprising forming the width in the sectional direction of the reduction area of said flame so as to be about more than 1.5 times as against the diameter of the formed vitreous silica body, and the length of the reduction area of said flame so as to be about more than 2.5 times as against said diameter, while retaining the head portion of the formed vitreous silica body within the reduction area of said flame to synthesize the high-purity transparent vitreous silica body.

1 Claim, 4 Drawing Figures

METHOD OF PRODUCING HIGH-PURITY TRANSPARENT VITREOUS SILICA BODY

This invention relates to a method of producing a high-purity transparent vitreous silica body of low OH content and comparatively large diameter (more than 15 mm), which is used as optical communication material or material for optical parts.

These days there is principally required a transparent vitreous silica of high purity and low OH content, as optical communication fiber material. "High purity" referred to herein means enough purity that realize optical loss value of less than 20 dB/Km in the wave length range 0.5-1.2 $\mu$ of the fiber which may be used as an optical communication fiber material. According to the report "Bell Laboratories Record, April 1972, page 104" by A. D. Pearson et al., for example, the impurity content of Fe is less than 0.02 ppm, that of Cu less than 0.05 ppm and that of Cr less than 0.02 ppm. The high-purity synthetic silica body obtained through flame hydrolysis, usually contains OH in the range from 1,000 to 2,000 ppm. As a method of producing a synthetic vitreous silica body of low OH content there is a proposal of the method of U.S. Pat. No. 3,275,408 owned by The Thermal Syndicate Ltd., but this method has such demerits as complexity of apparatus, unfavorable production rate and a great amount of electric power consumption.

The inventors of this invention proposed in U.S. patent application Ser. No. 616,077 now U.S. Pat. No. 4,038,370 a method of decreasing OH concentration of synthetic transparent vitreous silica body through flame hydrolysis of high purity silane gas. However, there is a disadvantage in above-mentioned method. It is impossible to decrease the OH concentration unless the heat treatment is effected during some ten hours at a temperature of more than 800° C. Another disadvantage of above-mentioned method is that, it is difficult to make a stable growth of high-purity transparent vitreous silica body of comparatively large diameter (15-20 mm).

In the present invention various experiments and studies have been made to improve said method of U.S. patent application Ser. No. 616,077, and it has been found that a transparent vitreous silica body of comparatively large diameter may be easily obtained if the width and length of the hydrogen-excess reduction area of said flame are respectively formed more than about 1.5 and 2.5 times as against the diameter of a growing head of the growing transparent vitreous silica body, while retaining the growing head within the reduction area of said flame to deposit a transparent vitreous silica body. In this method OH groups are almost dissociated at the time of synthesizing the transparent vitreous silica body so that it is no longer necessary to carry out heat treatment after the formation of said transparent vitreous silica body unlike the past.

In summary the present invention comprises a method of producing high-purity transparent vitreous silica body by flame hydrolysis of monosilane gas to deposit a high-purity transparent vitreous silica body and pulling said body down; said method comprising forming the width of the hydrogen excess reduction area of said flame to make said width more than approximately 1.5 times as against the diameter of a growing head of said vitreous silica body deposited and growing through the flame hydrolysis, and the length of the hydrogen excess reduction area of said flame to make the length more than approximately 2.5 times as against said diameter, while retaining the head portion of the formed vitreous silica body within the reduction area of said flame to deposit and grow the high-purity transparent vitreous silica body.

Figure 2:
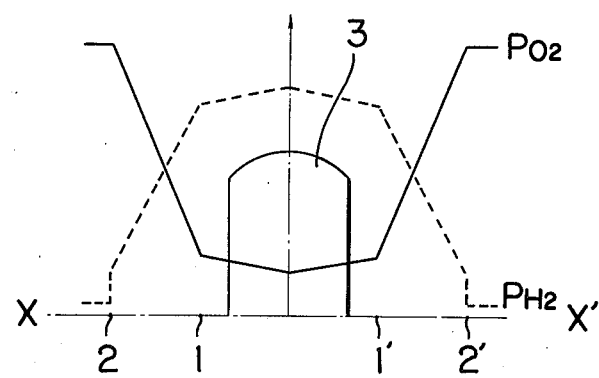
Figure 3:
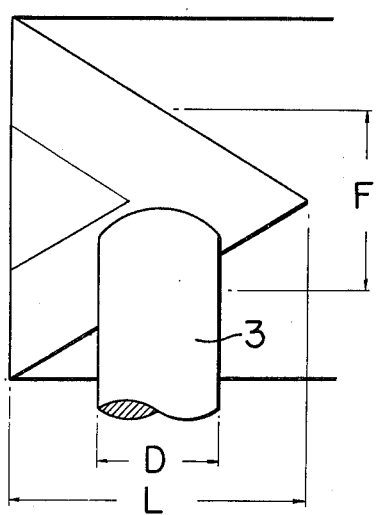
Figure 4:
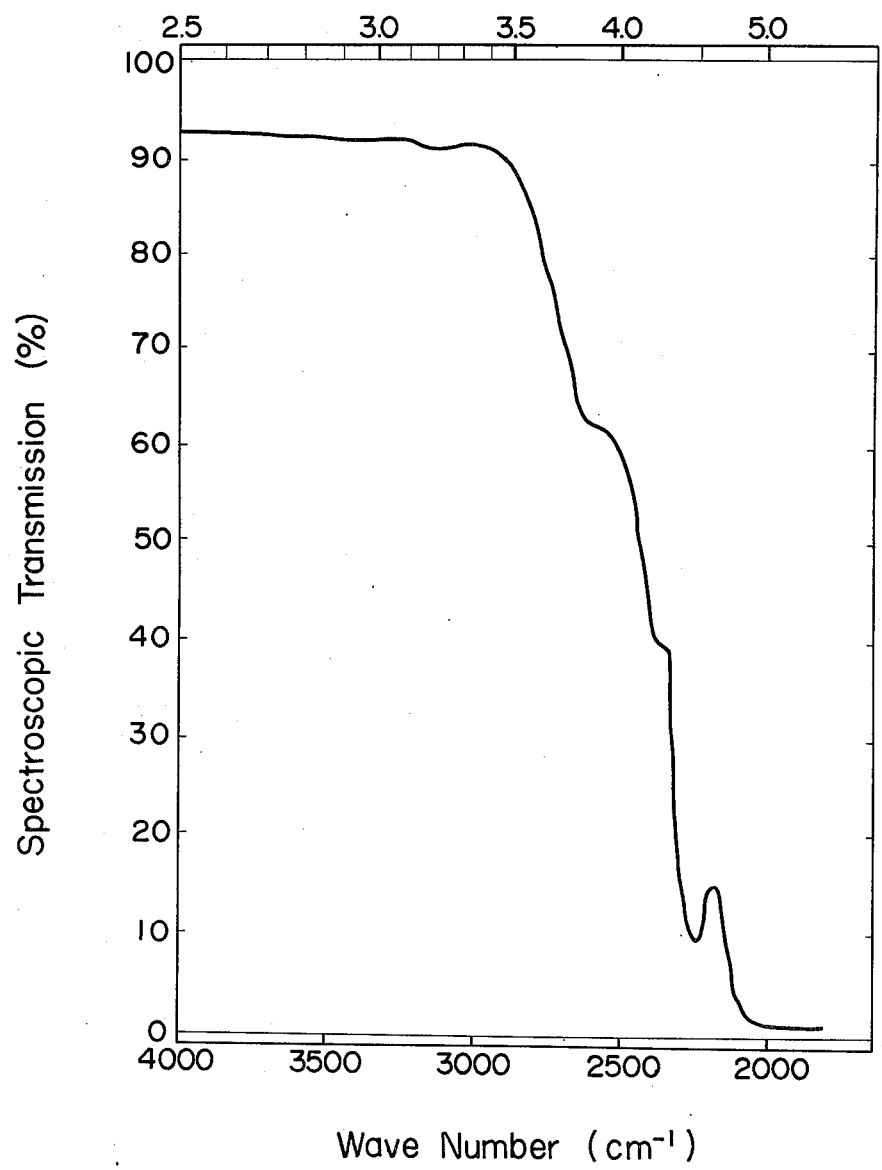

The invention will now be described further, by way of example only, with reference to the accompanying drawings, in which, FIG. 1 is a schematic plan view showing the relationship between flame structure and synthesized vitreous silica, FIG. 2 is a schematic view showing, as a positional relationship between the diametral direction of flame and a synthesized vitreous silica body, the oxygen partial pressure ($P_{O2}$ ... solid line) and the hydrogen partial pressure ($P_{H2}$ ... dotted line) in the sectional line X-X' of FIG. 1, FIG. 3 is a schematic view from the side of FIG. 1, and FIG. 4 is a result of having measured, by infrared absorption method, the transparent vitreous silica body obtained in an example of this invention.

FIG. 1 shows in a schematic plan view the relationship between the structure (where the arrows show the combustion direction and the flame center) of the flame and the diameter of a cylindrical portion of the grown head of said synthesized vitreous silica body. The flame hydrolysis reaction is produced by supplying monosilane gas and hydrogen gas from the center of a concentric burner (not shown) and an oxidizable gas from the outer periphery of that.

In the drawings reference numerals 1, 1' show a reduction area in hydrogen excess, and numerals 1, 2 and 1', 2' suboxidation areas formed by diffusion of the oxidizable gas from the outer periphery. Reference D is the outside diameter of the grown head of a synthetisized vitreous silica body 3, and references F and L respectively show the width of said reduction area and the length of the axial direction, which pass through the center of the grown head of said vitreous silica body. In the drawing are shown F/D = 1.5 and L/D = 2.5. Various methods are considered to increase the width and the length of said reduction area, and all the cases are applicable such as a case wherein the material gas ejection orifice in burner is provided plural, a case wherein the diameter of burner is made large, a case wherein gas flow rate is varied, and a case wherein the relative position of the formed vitreous silica body and the flame is varied.

FIG. 2 shows in a relative measure the oxygen partial pressure ($P_{O2}$ is a solid line) and the hydrogen partial pressure ($P_{H2}$ is a dotted line) in the flame in the section taken along the line X-X' of FIG. 1. The axis of abscissa shows a distance from the flame center, showing the relationship between the formed vitreous silica 3 and the reduction area 1-1' of flame, the axis of ordinate represents the variation of the oxygen partial pressure ($P_{O2}$) and hydrogen partial pressure ($P_{H2}$) in the flame combustion direction, and the arrow represents the central axis of a synthesized vitreous silica body 3. In the region 1-1' of the axis of abscissa the oxygen partial pressure ($P_{O2}$) is low and the hydrogen partial pressure ($P_{H2}$) is high thereby forming reduction area under exess hydrogen atmosphere, but in the areas 1-2 and 1'-2' both the oxygen partial pressure ($P_{O2}$) and hydrogen partial pressure ($P_{H2}$) gradually vary with a certain slant thereby forming a suboxidation area where the scales of the two partial pressures are reversed at a certain point of said areas. Moreover, the oxygen partial pressure ($P_{O2}$) becomes far higher inversely than the hydrogen partial pressure ($P_{H2}$) as they advance toward outer periphery.

FIG. 3 is a partially sectional schematic view from the side of FIG. 1, showing a relationship between the structure (where the two oblique line regions represent flame core and reduction area respectively) of the flame (when flame hydrolysis is reacted by supplying to the concentric burner (not shown) a silane type gas and hydrogen gas from the center of the burner and an oxidizable gas from the outer periphery thereof,) and the diameter of a synthesized vitreous silica body. A formed vitreous silica body 3 is positioned approximately at the center of excess hydrogen reduction area, and synthesized fine particles of vitreous silica body supplied from the flame center melts under deposition onto the growing head of the vitreous silica body 3, and the vitreous silica body 3 thus formed is pull down under rotation. At this time the grown head of the formed synthesized vitreous silica body is heated by uniform and sufficient reducing atmosphere of hydrogen excess flame, so that there are no non-molten portions and the diameter of the body is uniform whereby a stable growth of vitreous silica of large diameter is effected and whereby metastable OH groups are continuously removed by oxygen defect brought into the synthesized vitreous silica body by means of a heat treatment action.

In the thus synthesized vitreous silica body most of the OH groups are dissociated at the time of formation of the silica body so that it becomes possible easily to obtain a vitreous silica body of large diameter, which scarcely contains OH, requiring no new heat treatment after the formation, thereby remarkably increasing its productivity. The low OH concentration referred to herein is to be interpreted that it is less than 5 ppm (in contrast to $SiO_2$ weight ratio), and by the reduction areas is meant a region of flame in which the oxygen partial pressure in said area is at least lower than the equilibrium oxygen partial pressure of $H_2O$ at an operation temperature. On the other hand, in case the width and the length of the hydrogen excess reduction area of said flame are less than 1.5 times and 2.5 times respectively as against the diameter of the grown head of said vitreous silica body it is likely that the formed head of the vitreous silica body, which is growing under the varying conditions of gas flow rate, growth rate, influence of open air and the like or by the flickering of flame, gets out of the reduction area 1-1' (FIG. 1), and it is likely that the vitreous silica body 3 contacts the suboxidation area in 1-2 or 1'-2', so, that condition disturbs the growth temperature or the stable deposition of fine particles of synthesized vitreous silica. Since the stable growth of large diameter vitreous silica body becomes hard and it becomes likely that it partly contacts the suboxidation areas 1-2 and 1'-2' of flame, therefore, it is difficult to obtain directly the vitreous silica body scarcely containing OH groups (most of said vitreous silica body contains OH groups usually in the range from 50 to 60 ppm) and it results in requiring a heat treatment again after the formation.

In the present invention there can be applied the silicon compounds for which flame hydrolysis is possible regardless of hydrogen content in material gases, and it is also capable of applying these compounds even in manufacturing high-purity transparent vitreous silica body of small diameter.

As described above in detail, the invention easily produces large diameter vitreous silica by setting the width and length in the reduction area of flame larger than the diameter of the formed synthesized vitreous silica body with no influence of the change in the composition and flow rate of material gas or in burner construction in the flame hydrolysis of high-purity monosilane gas; and has an effect of directly making a mass production of high-purity vitreous silica body which hardly contains OH by means of a heat treatment action when the vitreous silica body is growing, thereby distinguishably contributing to the development of optical communication field.

EXAMPLE

To a burner nozzle there were fed in order, from the center of the concentric burner having 40 mm diameter, 0.5 l/min of monosilane gas ($SiH_4$), 2.0 l/min of hydrogen gas ($H_2$), 4 l/min of argon gas and 5.5 l/min of oxygen gas ($O_2$) to form flame, the width in the sectional direction of the hydrogen excess reduction area and the length of the axial direction in said flame were respectively made approximately double and triple the diameter of the cylindrical portion of said grown head of the growing vitreous silica body, the growing head of the vitreous silica body (of 15 mm in diameter) was maintained at a reduction area of the central portion of said flame axial direction, under rotation of 20 r.p.m. and at the pulling down rate of 1.5-2.0 mm/min, to deposit and grow the vitreous silica for about consecutive three hours to obtain a transparent vitreous silica body of 15 ± 0.5 mm in diameter and 300 mm in length. The OH content of said transparent vitreous silica body (a test piece of 2 mm in thickness) was measured by infrared absorption method to obtain the result as shown in FIG. 4. That is, there could be obtained a high-purity transparent vitreous silica body in which absorption in 2.73 $\mu$m wave length was not noticed and OH is hardly contained. In addition, a clad type fiber, the core of which was made of said high-purity transparent vitreous silica, was prepared for measurement of optical loss, to find that the optical loss was than 5 dB/Km under semiconductor LASER wave length (0.83 $\mu$m).

What is claimed is:

1. A method of producing high-purity transparent vitreous silica body by supplying to a burner, monosilane, argon, oxygen and hydrogen gases to form a flame and to effect hydrolysis of said silane within the flame to deposit a high-purity transparent vitreous silica body, said flame comprising a reduction area containing excess hydrogen, said method comprising continuously feeding said gases to said burner to deposit silica onto a growing head of said body while maintaining said head within said reduction area and continually pulling down said body, the width of the reduction area containing excess hydrogen being more than approximately 1.5 times the diameter of said growing head and the length of said reduction area being more than 2.5 times said diameter.

* * * * *